(12) United States Patent
Nihei

(10) Patent No.: US 10,749,781 B2
(45) Date of Patent: Aug. 18, 2020

(54) SETTING DEVICE, SETTING METHOD, RECORDING MEDIUM TO WHICH SETTING PROGRAM IS RECORDED, COMMUNICATION SYSTEM, CLIENT DEVICE, AND SERVER DEVICE

(71) Applicant: NEC Corporation, Tokyo (JP)

(72) Inventor: Koichi Nihei, Tokyo (JP)

(73) Assignee: NEC Corporation, Tokyo (JP)

(*) Notice: Subject to any disclaimer, the term of this patent is extended or adjusted under 35 U.S.C. 154(b) by 117 days.

(21) Appl. No.: 15/527,271

(22) PCT Filed: Nov. 10, 2015

(86) PCT No.: PCT/JP2015/005615
§ 371 (c)(1),
(2) Date: May 16, 2017

(87) PCT Pub. No.: WO2016/079948
PCT Pub. Date: May 26, 2016

(65) Prior Publication Data
US 2018/0013652 A1 Jan. 11, 2018

(30) Foreign Application Priority Data
Nov. 18, 2014 (JP) .................. 2014-233883

(51) Int. Cl.
H04L 12/26 (2006.01)
H04W 24/06 (2009.01)
(Continued)

(52) U.S. Cl.
CPC .......... H04L 43/0882 (2013.01); H04L 1/205 (2013.01); H04L 43/10 (2013.01);
(Continued)

(58) Field of Classification Search
CPC ......... G06F 17/18; H04L 1/205; H04L 1/142; H04L 43/0882; H04L 43/10;
(Continued)

(56) References Cited

U.S. PATENT DOCUMENTS

2005/0120176 A1* 6/2005 Maeda ................. G06F 3/0607
711/114
2006/0083168 A1 4/2006 Prakash
(Continued)

FOREIGN PATENT DOCUMENTS

CA 2585099 A1 4/2006
JP 2002-157053 A 5/2002
(Continued)

OTHER PUBLICATIONS

Extended European Search Report issued by the European Patent Office for European Application No. 15861127.7 dated Jun. 5, 2018 (7 pages).
(Continued)

Primary Examiner — Jianye Wu
(74) Attorney, Agent, or Firm — Wilmer Cutler Pickering Hale and Dorr LLP

(57) ABSTRACT

Provided is a setting device and the like with which correct estimation of a communication band is possible. The setting device 101 has a transmission unit 102 that, on the basis of a first timing at which a first information processing device 401 transmits to a second information processing device 402 a first signal for measuring a communication band which pertains to a communication network 403, transmits to the second information processing device 402 a setting signal for setting a communication unit 407 of the second information processing device 402 to a communication-enabled state.

13 Claims, 14 Drawing Sheets

(51) Int. Cl.
*H04W 52/02* (2009.01)
*H04L 1/20* (2006.01)
*G06F 17/18* (2006.01)
*H04L 12/24* (2006.01)

(52) U.S. Cl.
CPC ....... *H04W 24/06* (2013.01); *H04W 52/0232* (2013.01); *H04W 52/0235* (2013.01); *G06F 17/18* (2013.01); *H04L 41/142* (2013.01); *Y02D 70/00* (2018.01); *Y02D 70/1262* (2018.01); *Y02D 70/24* (2018.01)

(58) Field of Classification Search
CPC .. H04L 41/142; Y02D 70/00; Y02D 70/1262; H04W 52/0232; H04W 52/0235; H04W 24/06
See application file for complete search history.

(56) References Cited

U.S. PATENT DOCUMENTS

| | | | | |
|---|---|---|---|---|
| 2007/0237103 | A1* | 10/2007 | Reynolds | H04L 41/0896 370/310.2 |
| 2013/0034012 | A1* | 2/2013 | Oshiba | H04L 43/0882 370/252 |
| 2014/0056143 | A1 | 2/2014 | Hedlund et al. | |
| 2014/0056157 | A1* | 2/2014 | Hedlund | H04W 24/02 370/252 |
| 2014/0056158 | A1 | 2/2014 | Hedlund et al. | |
| 2014/0056159 | A1 | 2/2014 | Hedlund et al. | |
| 2014/0056218 | A1 | 2/2014 | Hedlund et al. | |
| 2014/0056233 | A1 | 2/2014 | Hedlund et al. | |
| 2014/0056234 | A1 | 2/2014 | Hedlund et al. | |

FOREIGN PATENT DOCUMENTS

| | | |
|---|---|---|
| JP | 2006-324945 A | 11/2006 |
| JP | 2011-142622 A | 7/2011 |
| JP | 2011-254409 A | 12/2011 |
| JP | 2013-123103 A | 6/2013 |
| JP | 5239791 B2 | 7/2013 |
| JP | 2013-242276 A | 12/2013 |
| JP | 2014-135685 A | 7/2014 |
| WO | WO-2006-045100 A2 | 4/2006 |
| WO | WO-2011-132783 A1 | 10/2011 |
| WO | WO-2013-008387 A1 | 1/2013 |
| WO | WO-2014-007166 A1 | 1/2014 |

OTHER PUBLICATIONS

Daisuke Kobayashi, "Evaluation of end-to-end bandwidth measurement method with power-saving routers", Technical Report of the Proceeding of the Institute of Electronics, Information and Communication Engineers, Oct. 6, 2011, vol. 111, No. 232, pp. 45-50.
International Search Report for PCT/JP2015/005615 dated Feb. 9, 2016 (4 Pages).
Written Opinion for PCT/JP2015/005615 dated Feb. 9, 2016 (5 Pages).
Daisuke Kobayashi et al. "Evaluation of end-to-end bandwidth measurement method with power-saving routers", IEICE Technical Report, Japan, IEICE, Oct. 6, 2011, vol. 111, No. 232, pp. 45-50 (6 pages).
Japanese Notice of Reasons for Refusal issued in Japanese Patent Application No. 2016-559802, dated Jul. 16, 2019, 5 pages.

* cited by examiner

SETTING DEVICE, SETTING METHOD, RECORDING MEDIUM TO WHICH SETTING PROGRAM IS RECORDED, COMMUNICATION SYSTEM, CLIENT DEVICE, AND SERVER DEVICE

CROSS REFERENCE TO RELATED APPLICATIONS

This application is a national stage application of International Application PCT/JP2015/005615 entitled "SETTING DEVICE, SETTING METHOD, RECORDING MEDIUM TO WHICH SETTING PROGRAM IS RECORDED, COMMUNICATION SYSTEM, CLIENT DEVICE, AND SERVER DEVICE" filed Nov. 10, 2015, which claims benefit of priority of Japanese Application Serial No. 2014-233883, filed on Nov. 18, 2014, the disclosures of each of which are hereby incorporated by reference in their entirety.

TECHNICAL FIELD

The present invention relates to a setting device and the like that set an information processing device to a communication-enabled state.

BACKGROUND ART

Examples of systems that are capable of estimating a communication bandwidth in a communication network include systems described in PTL 1 to PTL 6.

PTL 1 discloses a network bandwidth measurement system that estimates a communication bandwidth based on a sequence of a plurality of packets with gradually increasing size or gradually decreasing size. For convenience of explanation, a sequence of a plurality of packets with gradually increasing size or gradually decreasing size will be hereinafter referred to as a "packet train".

The network bandwidth measurement system includes a packet generation unit, a packet transmission unit, a reception interval measuring unit and a bandwidth computing unit. The packet generation unit generates a sequence of a plurality of packets with gradually increasing size or gradually decreasing size. The packet transmission unit transmits the plurality of generated packets at predetermined transmission intervals. The reception interval measuring unit sequentially receives each packet and measures reception intervals each representing an interval between timings at which packets are received. The bandwidth computing unit estimates a communication bandwidth in a communication network on the base of the largest packet size among packets whose reception interval is equal to their transmission interval.

PTL 2 discloses a usable bandwidth measurement system that estimates a communication bandwidth on the base of time needed to transmit and receive packets with increasing size by a fixed common difference. The usable bandwidth measurement system has the function of changing packet size on the base of the estimated communication bandwidth.

PTL 3 discloses a flow rate prediction device that generates a stochastic process model for estimating communication throughput based on the communication throughput of a communication network, for example. The flow rate prediction device determines, based on communication throughput changing over time, whether the communication throughput is in a steady state or non-steady state. The flow rate prediction device then selects a stochastic process model for estimating the communication throughput based on the determination result and computes parameters of the selected stochastic process model.

PTL 4 discloses a parameter estimating device that determines, based on communication throughputs acquired before a first time point, a probability density function for estimating a communication throughput at a second time point.

PTL 5 discloses a degradation avoiding method that identifies, based on transmission/reception qualities of a plurality of media, a medium with degraded quality of transmission/reception processing and determines whether to reduce the rate of communication flow on the medium or not. The degradation avoiding method identifies a medium with degraded quality of transmission/reception processing in accordance with correlation between priorities of a plurality of media and the degradation degree of transmission/reception quality of the media and reduces the rate of communication flow on the media correlated to the identified medium.

PTL 6 discloses a delay variation prediction device, relating to a packet, that identifies an ARCH type model on the base of a delay time difference that changes over time and estimates jitter on the base of the identified ARCH type model. ARCH type modeling is a well-known method for precisely modeling a transition of volatility in the fields of financial engineering and econometrics. The delay variation prediction device estimates changes in jitter as statistically estimated quantities concerning time series representing delay time differences in accordance with the ARCH model. The delay variation prediction device computes parameters of an ARCH type model on the base of delay time differences. ARCH is abbreviation of Autoregressive conditional heteroscedasticity.

CITATION LIST

Patent Literature

PTL 1: Japanese Unexamined Patent Application Publication No. 2011-142622
PTL 2: International Publication No. WO 2011/132783
PTL 3: International Publication No. WO 2014/007166
PTL 4: International Publication No. WO 2013/008387
PTL 5: Japanese Patent No. 5239791
PTL 6: Japanese Unexamined Patent Application Publication No. 2014-135685

SUMMARY OF INVENTION

Technical Problem

Communication facility of an information processing device (terminal) can be, for example, in a first state representing a state with higher (better) throughput than a predetermined throughput or a second state representing a state with lower (poorer) throughput than the predetermined throughput. For example, the first state represents an active state in which processing relating to communication (communication processing) is enabled. The second state represents a sleep state in which communication processing is disabled, for example. When the communication facility is in the second state, communication information (communication data) destined to the communication facility is temporarily stored in a router, a wireless base station, or the like in a communication network. The information processing device, for example, checks whether or not communication information is stored in the wireless base station or the like at each predetermined timing. If the communication information is stored, the information processing device sets the communication facility to the first state. Then, the communication facility reads the communication information stored in the wireless base station or the like. The communication facility performs processing relating to the read communication information.

The network bandwidth measurement system disclosed in PTL 1 cannot necessarily precisely estimate a communication bandwidth relating to the communication network as described above. This is because the communication facility collectively receives communication information stored while the communication facility is in the second state and therefore parameters (for example timing of reception) concerning the communication information differ from parameters concerning communication information in the first state.

For example, even when a first information processing device sequentially transmits signals (packets) to a second information processing device, the communication facility in the second information processing device collectively receives the signals at once after the communication device has been in the second state. Consequently, the communication facility of the second information processing device cannot precisely estimate a communication bandwidth when the communication facility estimates the communication bandwidth on the base of the timing at which a signal is received, for example.

Therefore, a main object of the present invention is to provide a setting device and the like that enable precise estimation of a communication bandwidth.

Solution to Problem

In order to achieve the aforementioned object, as an aspect of the present invention, a setting device including: transmission means for transmitting, in accordance with a first timing at which a first information processing device transmits a first signal for measuring communication bandwidth of a communication network to a second information processing device, a setting signal for setting communication means of the second information processing device into a communication-enabled state to the second information processing device.

In addition, as another aspect of the present invention, a setting method including: transmitting, in accordance with a first timing at which a first information processing device transmits a first signal for measuring communication bandwidth of a communication network to a second information processing device, a setting signal for setting communication means of the second information processing device into a communication-enabled state to the second information processing device.

In addition, as another aspect of the present invention, a setting program making a computer achieve including: a transmission function for transmitting, in accordance with a first timing at which a first information processing device transmits a first signal for measuring communication bandwidth of a communication network to a second information processing device, a setting signal for setting communication means of the second information processing device into communication-enabled state to the second information processing device.

Furthermore, the object is also realized by an associated setting program, and a computer-readable recording medium which records the program.

Advantageous Effects of Invention

A setting device and the like according to the present invention enable precise estimation of a communication bandwidth.

DESCRIPTION OF EMBODIMENTS

Next, example embodiments of the present invention will now be described in detail with reference to the drawings.

First Example Embodiment

Figure 1:
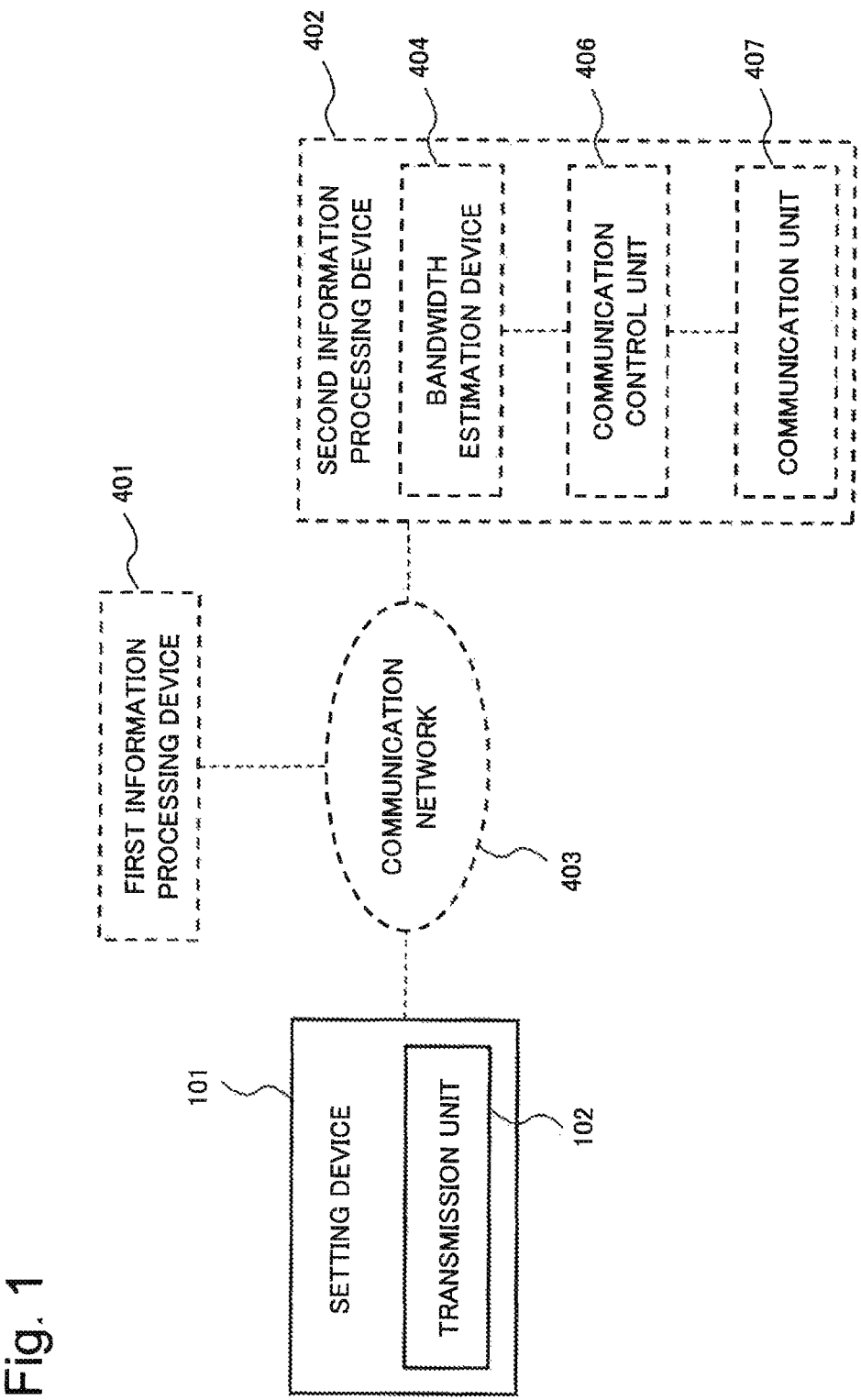
FIG. 1 is a block diagram illustrating a configuration of a setting device according to a first example embodiment of the present invention.

A configuration of a setting device 101 according to a first example embodiment of the present invention will be described in detail with reference to FIG. 1. FIG. 1 is a block diagram illustrating a configuration of a setting device 101 according to the first example embodiment of the present invention.

The setting device 101 according to the first example embodiment includes a transmission unit 102.

The setting device 101, a first information processing device 401 and a second information processing device 402 are capable of transmitting and receiving information to and from one another via a communication network 403. The second information processing device 402 includes a communication control unit 406 and a communication unit 407. The second information processing device 402 may include a bandwidth estimation device 404.

The bandwidth estimation device 404 may be a device separate from the second information processing device 402. For convenience of explanation, it is assumed hereinafter that the second information processing device 402 includes the bandwidth estimation device 404.

Figure 3:
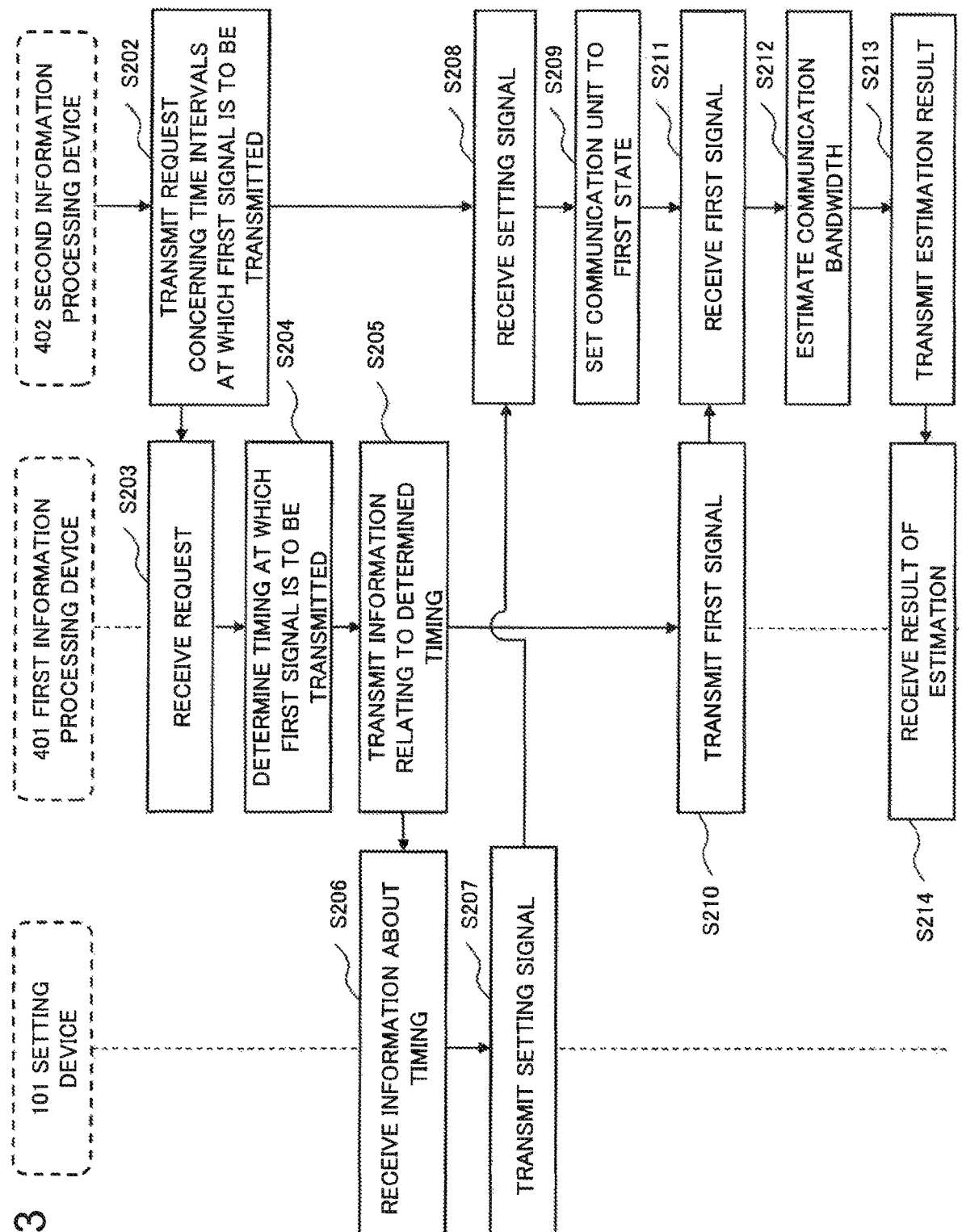
FIG. 3 is a sequence diagram illustrating processing performed by the setting device, a first information processing device, and a second information processing device.

When the first information processing device 401 (for example a server device) and the second information processing device 402 (for example a client device or terminal) start to communicate with each other, the first information processing device 401 and the second information processing device 402 negotiate with each other. The negotiation is a processing of determining parameters for communication, before establishing communication connection, by exchanging the parameters such as a transmission rate, a communication protocol and parameters for estimating a communication bandwidth Processing performed by the setting device 101, the first information processing device 401 and the second information processing device 402 will be described with reference to FIG. 3. FIG. 3 is a sequence diagram illustrating the process performed by the setting device 101, the first information processing device 401, and the second information processing device 402.

The second information processing device 402 transmits, to the first information processing device 401, a request for setting time intervals between transmission of a plurality of signals (hereinafter referred to as the "first signals"), such as a packet train shown in the Background Art, used for estimating a communication bandwidth (step S202).

The first information processing device 401 receives the request (step S203). The first information processing device 401 then determines the timing (for example a K-th timing, which will be described later) of transmitting a K-th first signal (where K represents a natural number between 1, inclusive, and N, inclusive) on the base of time intervals (transmission intervals) included in the request (step S204). The first information processing device 401 transmits information indicating the determined timing (timing information) to the setting device 101 (step S205). The timing information may be information indicating a time interval between the K-th timing and the (K+1)-th timing or information representing the K-th timing, for example.

Processing for determining the timing will be described by using an example in which the first signals, that is transmitted and received for estimating a communication bandwidth, are packets in a packet train. The packets in a packet train are, for example, sent out at transmission intervals determined during negotiation. The transmission intervals represent, for example, a time interval (period) between a timing for transmitting a J-th bit of a packet (where J represents a natural number) and a timing for transmitting the J-th bit of the next packet. The first signal is not limited to the example described above but may be any signal that the first information processing device 401 transmits to the second information processing device 402.

A communication bandwidth is estimated on the base of the timing at which the second information processing device 402 receives the first signal.

The setting device 101 receives the timing information (step S206). The transmission unit 102 transmits, to the second information processing device 402, a setting signal for setting the communication unit 407 to a communication-enabled state (i.e. a first state, which will be described later), on the base of timing (or time intervals) included in the received timing information (step S207).

For example, the transmission unit 102 may transmit the setting signal at the time intervals based on the received timing information when the time interval between the K-th timing and the (K+1)-th timing is constant (or substantially constant). As described in the descriptions of example embodiments given later, the transmission unit 102 may transmit the setting signal when a predetermined condition is satisfied. For example, a predetermined interval may be the time that elapses between the timing of the last communication processing performed by the communication unit 407 in an active state in the second information processing device 402 and the timing at which the communication unit 407 is set into a sleep state.

In each example embodiment of the present invention, the active state represents a first state representing a state of higher (better) throughput than a predetermined throughput. The sleep state represents a second state representing a state of lower (poorer) throughput than the predetermined throughput. In the process illustrated in step S207, the transmission unit 102 may read the K-th timing from the received timing information and may transmit the setting signal at a timing before the read K-th timing and close to the K-th timing.

Figure 2:
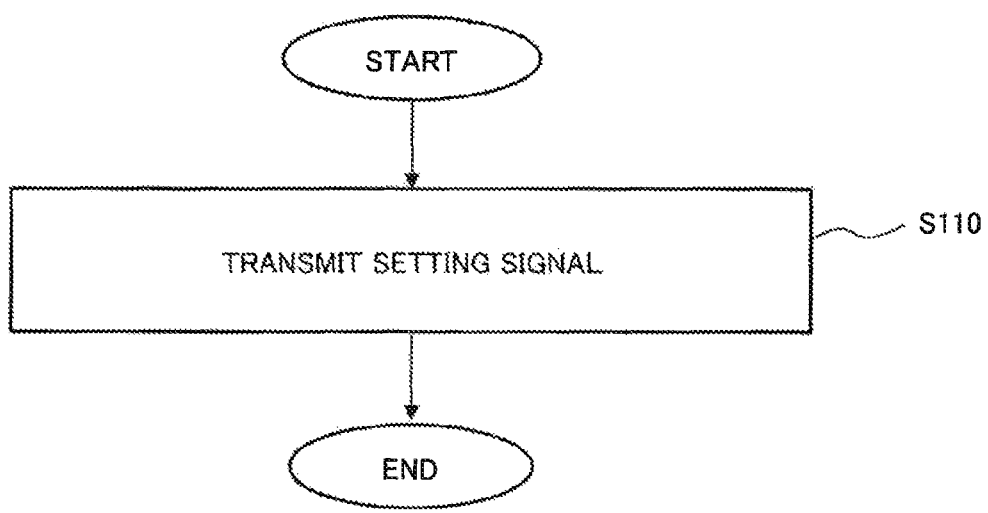
FIG. 2 is a flowchart illustrating a process flow in the setting device according to the first example embodiment.

Referring to FIG. 2, in the processing relating to step S207 (FIG. 3) described above, the transmission unit 102 transmits the setting signal to the second information processing device 402 in accordance with the K-th timing (step S110). FIG. 2 is a flowchart illustrating a process flow in the setting device 101 according to the first example embodiment.

On the other hand, the first information processing device 401 transmits a first signal to the second information processing device 402 when the determined timing is reached after the establishment of a communication connection (step S210).

The communication control unit 406 in the second information processing device 402 receives the setting signal transmitted from the setting device 101 (step S208) and sets the communication unit 407 in the second information processing device 402 to the first state (step S209). Then, the communication unit 407 receives the first signal in response to the arrival of the first signal from the first information processing device 401 (step S211).

Figure 4:
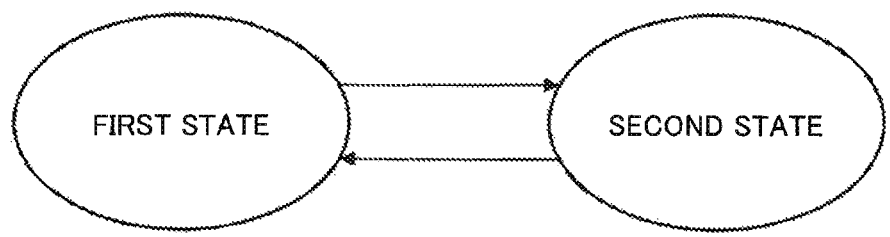
FIG. 4 is a diagram conceptually illustrating example states of a communication unit.

The communication unit 407 in the second information processing device 402 which receives a setting signal transmitted from the setting device 101 will be described with reference to FIG. 4. FIG. 4 is a diagram conceptually illustrating example states of the communication unit 407. For example, the communication unit 407 can be in a first state or in a second state. The communication unit 407 can perform communication processing when the communication unit 407 is in the first state. The communication unit 407 in the first state is set to the second state in case that communication processing has not been performed for a certain long period of time.

On the other hand, when the communication unit 407 is in the second state, communication information destined to the communication unit is temporarily stored in a router, a wireless base station, or the like in the communication network. The second information processing device 402 checks whether or not communication information is stored in the wireless base station or the like, for example, at a given timing. If the communication information is stored, the second information processing device 402 sets the communication unit 407 to the first state.

The process performed when the communication unit 407 in the second information processing device 402 is in the second state will be described in further detail. When the communication unit 407 is in the second state, communication information (for example, information transmitted and received) relating to the second information processing device 402 is stored in a router, a wireless base station, or the like, for example, in the communication network 403. During the second state in the communication unit 407, the communication control unit 406 monitors signals transmitted from the wireless base station or the like at each predetermined interval, for example, to see whether or not there is communication information. When the communication control unit 406 determines that there is communication information in the wireless base station or the like, the communication control unit 406 sets the communication unit 407 to the first state. During the first state in the communication unit 407, the communication unit 407 receives the communication information from the wireless base station or the like and performs communication processing relating to the received communication information. In this case, the communication unit 407 collectively receives the communication information stored in the wireless base station or the like at once.

For example, in the case of LTE defined in 3GPP, the first state is the RRC Connected and Active state whereas the second state is the RRC Connected and Short DRX state, the Long DRX state, or the RRC Idle state.

3GPP is an abbreviation of Third Generation Partnership Project. LTE is an abbreviation of Long Term Evolution. RRC is an abbreviation of Radio Resource Control. DRX is an abbreviation of discontinuous reception.

Processing subsequent to step 211 will be described next with reference to FIG. 3. In response to the second information processing device 402 receiving the first signal, the bandwidth estimation device 404 estimates a communication bandwidth relating to the communication network 403 on the base of the first signal (step S212). For example, the communication bandwidth may be estimated in accordance with a procedure disclosed in PTL 1. However, the present invention described using the present example embodiment as an example is not limited to the procedure disclosed in PTL 1. Any procedure with which a communication bandwidth can be estimated on the base of a signal transmitted and received may be used.

The second information processing device 402 transmits the estimation result of the communication bandwidth to the first information processing device 401 (step S213).

A timing at which the second information processing device 402 performs process illustrated in step S213 in response to a K-th first signal will be hereinafter referred to as the "K-th reply timing".

The first information processing device 401 receives the estimation result transmitted from the second information processing device 402 (step S214).

When the (K+1)-th first signal is transmitted, processing similar to the processing performed when the K-th first signal is transmitted is performed. In the following description, the process performed when the (K+1)-th first signal is transmitted will be described with reference to the step numbers used in the description of the process performed when the K-th first signal is transmitted.

Based on the timing (or time intervals) included in timing information received by the setting device 101, the transmission unit 102 transmits a setting signal for setting the communication unit 407 to a communication-enabled state to the communication control unit 406 (step S207).

In response to receiving the setting signal (step S208), the communication control unit 406 in the second information processing device 402 sets the communication unit 407 in the second information processing device 402 to the first state (step S209).

In response to the arrival of the (K+1)-th timing, the first information processing device 401 transmits a first signal to the second information processing device 402 (step S210).

In response to the communication unit 407 receiving the first signal after having been set to the first state, the bandwidth estimation device 404 estimates a communication bandwidth relating to the communication network 403 (steps S209, S211 and S212). The second information processing device 402 transmits the estimation result of the communication bandwidth in the bandwidth estimation device 404 to the first information processing device 401 (step S213). The first information processing device 401 receives the estimation result (step S214).

Advantageous effects of the setting device according to the first example embodiment of the present invention will be described next.

The setting device 101 according to the present example embodiment can provide an environment that enables precise estimation of a communication bandwidth. This is because, in response to receiving a setting signal, the communication unit 407 in the second information processing device 402 is set to the first state and then receives a first signal.

The reason that the advantageous effect described above is achieved will be described in detail. In response to arrival of a first signal during the first state in the communication unit 407, the communication unit 407 in the second information processing device 402 receives the first signal. Accordingly, the timing of arrival of the first signal is precisely measured and therefore, in the setting device 101 according to the present example embodiment, for example, the bandwidth estimation device 404 can precisely estimate a communication bandwidth relating to the communication network 403.

Whereas, the first information processing device 401 can possibly transmit the first signal to the communication unit 407 in a period in which the second information processing device 402 is not set to the first state by the setting device 101 according to the present example embodiment and the communication unit 407 is in the second state. In this case, the wireless base station or the like temporarily stores the first signal in itself as described with reference to FIG. 4. If communication information is stored in the wireless base station or the like, for example, the second information processing device 402 changes the communication unit 407 from the second state to the first state. Then the communication unit 407 collectively receives the communication information including the first signal from the wireless base station or the like at once. Accordingly, the timing of arrival of the first signal is not precisely measured and therefore the bandwidth estimation device 404 cannot precisely estimate a communication bandwidth.

Further, when the transmission unit 102 transmits a setting signal at a timing before the K-th timing and close to the K-th timing, the setting device 101 according to the present example embodiment has the following advantageous effect. The setting device 101 according to the present example embodiment has the advantageous effect of precisely estimating a communication bandwidth relating to the communication network 403 and, in addition, the advantageous effect of reducing the costs of estimating the communication bandwidth. The costs include power consumption in the communication unit 407, for example. This is because the period of time between the timing at which the communication unit 407 in the second information processing device 402 is set into the first state and the K-th timing is short. Since the transmission unit 102 transmits the setting signal at the timing before the K-th timing and close to the K-th timing, the communication unit 407 can receive a signal transmitted from the first information processing device 401 around the time when the communication unit 407 has been set into the first state according to the setting signal. Consequently, the period of time between the timing at which the communication unit 407 in the second information processing device 402 is set into the first state and the K-th timing is short.

Figure 5:
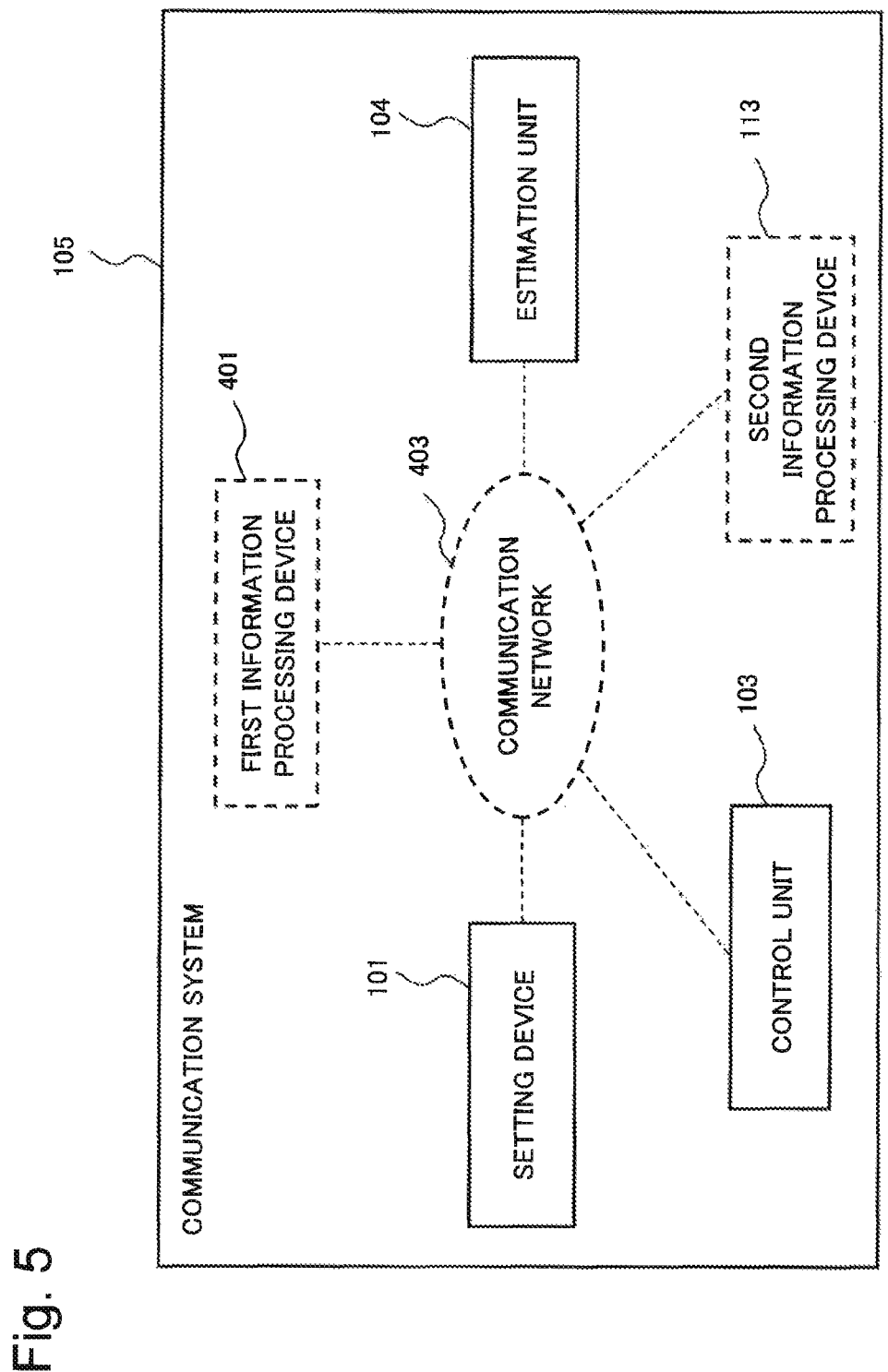
FIG. 5 is a block diagram illustrating a configuration of a communication system according to the first example embodiment.

The setting device 101 may be a part of a communication system 105, for example, as illustrated in FIG. 5. FIG. 5 is a block diagram illustrating a configuration of the communication system 105 according to the first example embodiment.

The communication system 105 includes the setting device 101, a control unit 103, a first information processing device 401, an estimation unit 104, a second information processing device 113, and a communication network 403. The setting device 101, the control unit 103, the first information processing device 401, the estimation unit 104, and the second information processing device 113 are capable of communicating with one another via the communication network 403.

The estimation unit 104 has functions similar to the bandwidth estimation device 404 described above. The second information processing device 113 has functions similar to the communication control unit 406 and the communication unit 407 in the second information processing device 402 described above. In other words, the second information processing device 113 includes a communication control unit 406 and a communication unit 407. The control unit 103 controls communication performed via the communication network 403.

For example, the communication system 105 may include a decision device (not depicted) that decides to add or remove a control unit 103 that controls communication via the communication network 403 in the communication system 105 in accordance with a estimation result relating to a communication bandwidth. In this case, when the estimated communication bandwidth is smaller (narrower) than a predetermined first value, the decision device decides to add the control unit 103. On the other hand, when the estimated communication bandwidth is greater (broader) than a predetermined second value, the decision device decides to remove the control unit 103.

Figure 6:
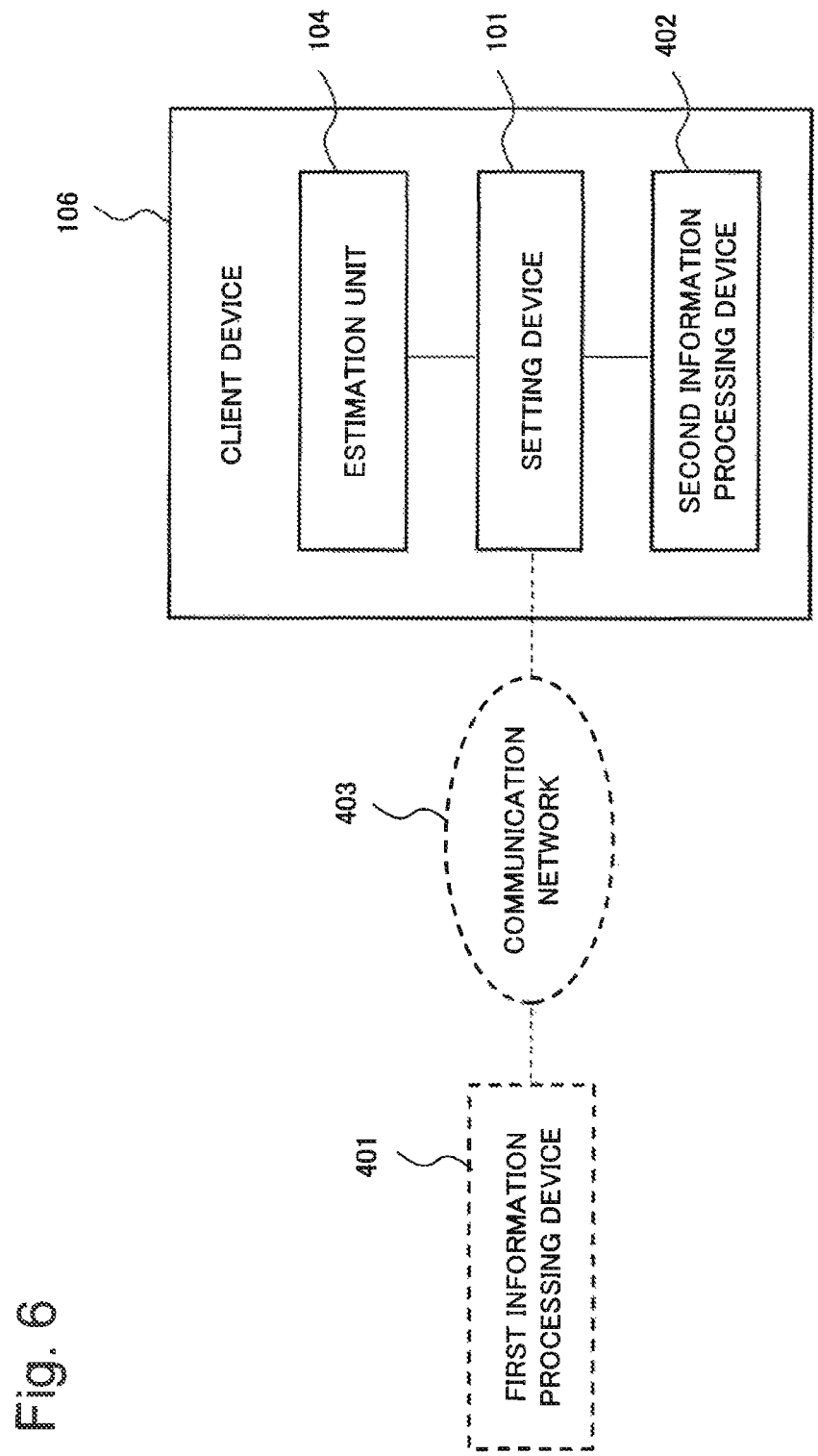
FIG. 6 is a block diagram illustrating an example configuration of a client device according to the first example embodiment.

In another example, a client device 106 may include a setting device 101 as illustrated in FIG. 6. FIG. 6 is a block diagram illustrating an example configuration of the client device 106 according to the first example embodiment.

The client device 106 includes a setting device 101, an estimation unit 104, and the second information processing device 402. The client device 106 is capable of transmitting and receiving information to and from a first information processing device 401 via a communication network 403.

The client device 106 (FIG. 6) according to the first example embodiment has the advantageous effect of precisely estimating a communication bandwidth relating to the communication network 403 and, in addition, the advantageous effect of providing an environment that enables a communication bandwidth to be precisely estimated with a small amount of communication traffic. This is because a setting signal does not pass through the communication network 403. Specifically, since the client device 106 has the configuration described above, the process by the setting device 101 for transmitting the setting signal to the second information processing device 402 is performed within the client device 106. Accordingly, the setting signal arrives at the second information processing device 402 without passing through the communication network 403. Consequently, in accordance with the configuration of the client device 106 including the setting device 101 and the second information processing device 402, the amount of communication traffic on the communication network 403 is reduced.

Figure 7:
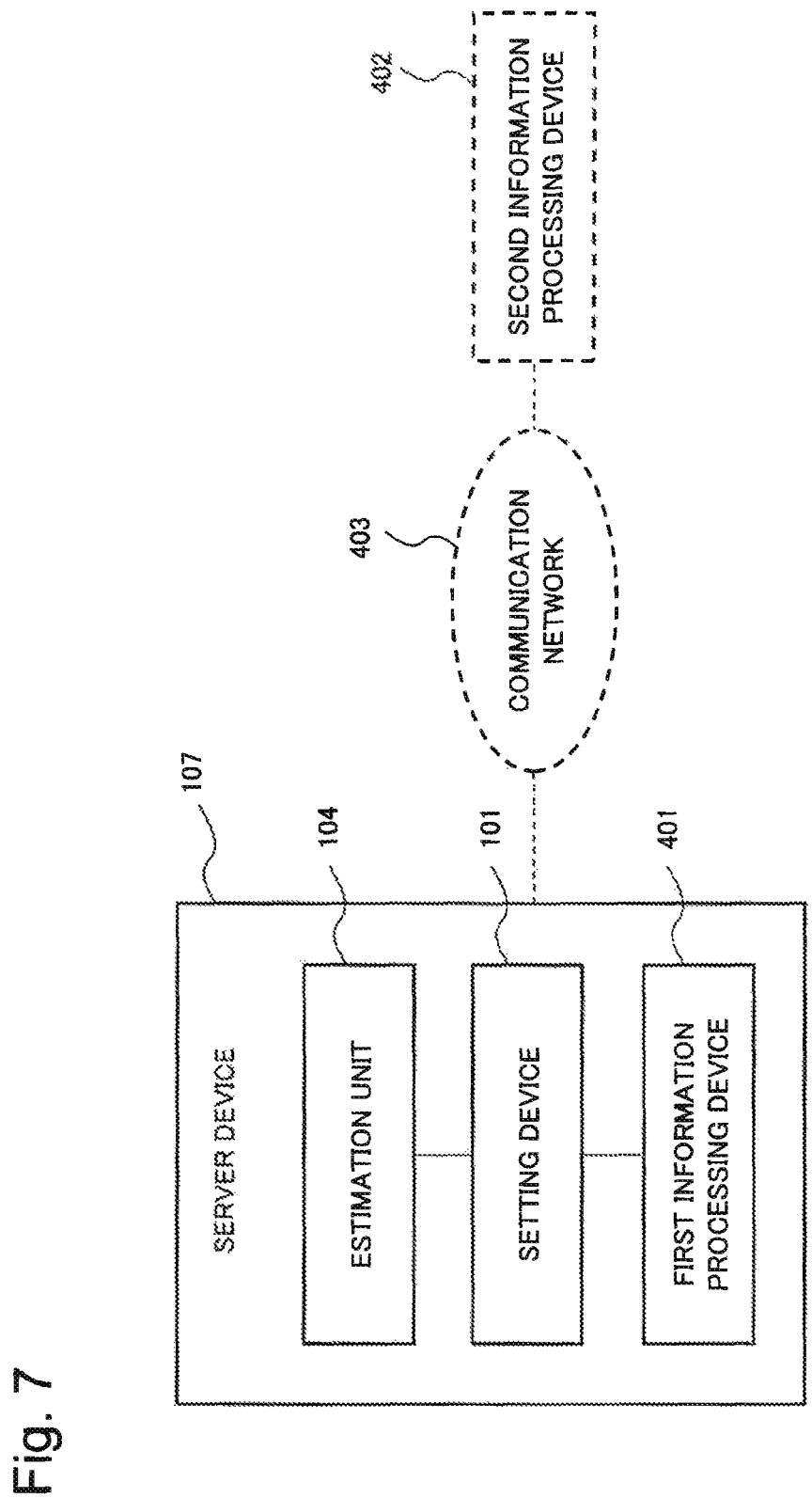
FIG. 7 is a block diagram illustrating an example configuration of a server device according to the first example embodiment.
Figure 8:
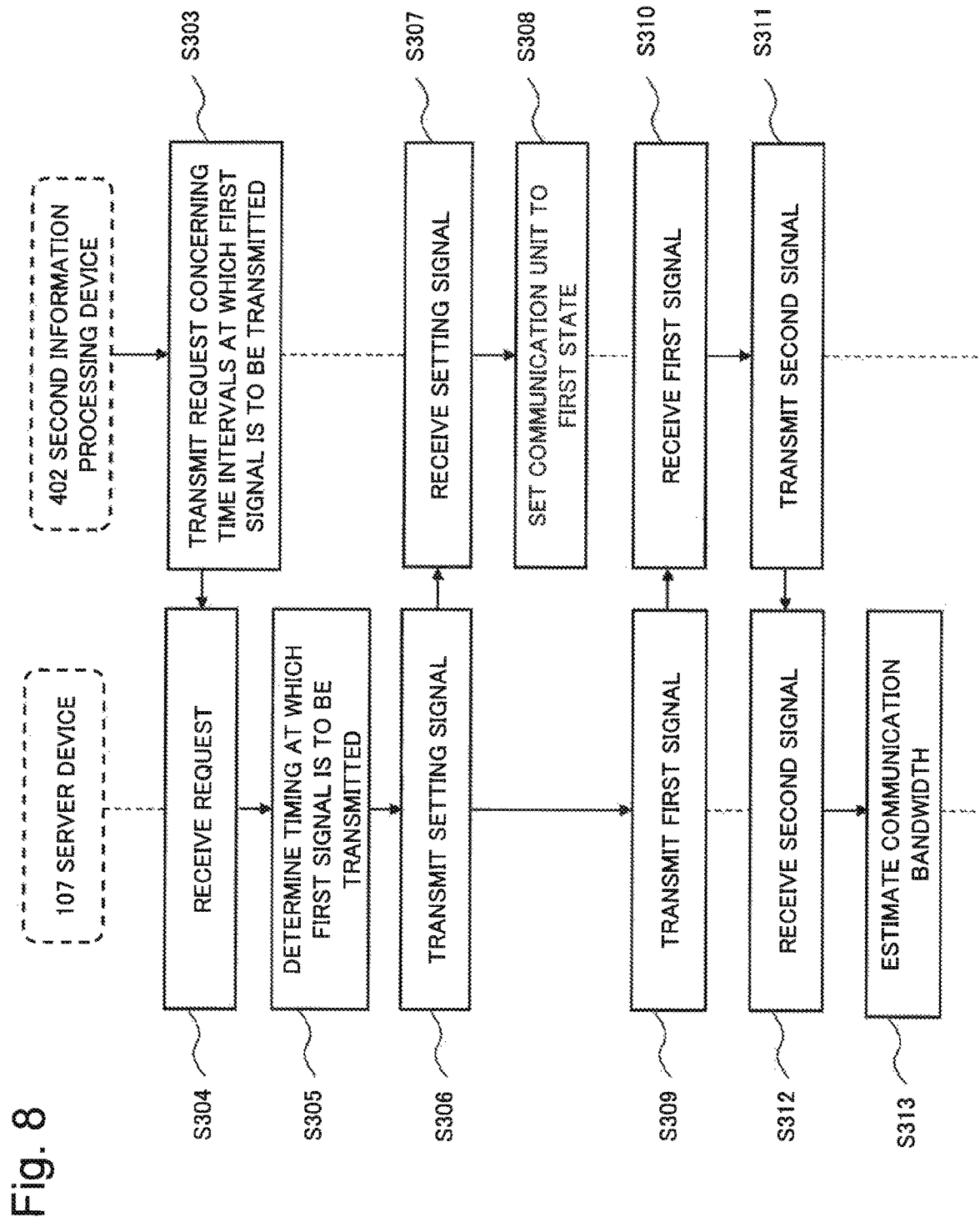
FIG. 8 is a sequence diagram illustrating an example of a process flow in the server device and a second information processing device according to the first example embodiment.

As an alternative to the processing mode illustrated in FIG. 6, a configuration of a server device 107 that includes a setting device 101 and processing performed by the server device 107 will be described in detail with reference to FIGS. 7 and 8. FIG. 7 is a block diagram illustrating an example configuration of the server device 107 according to the first example embodiment. FIG. 8 is a sequence diagram illustrating an example of a flow of processing in the server device 107 and the second information processing device 402 according to the first example embodiment.

The server device 107 may include the setting device 101, a first information processing device 401 and an estimation unit 104.

The server device 107 is capable of transmitting and receiving information to and from the second information processing device 402 via a communication network 403.

As in the process illustrated in step S202 in FIG. 3, the first information processing device 401 transmits to the first information processing device 401 a request for setting time intervals at which a first signal is to be transmitted (step S303). Then, the server device 107 receives the request (step S304). Then, the first information processing device 401 determines a timing at which a K-th first signal is to be transmitted (where K represents a natural number between 1, inclusive, and N, inclusive) on the base of the time intervals (transmission intervals) included in the request (step S305).

A transmission unit 102 transmits a setting signal for setting a communication unit 407 to the first state, that is a communication-enabled state, to the second information processing device 402 on the base of the timing (or time intervals) determined by the first information processing device 401 (step S306). In response to receiving the setting signal (step S307), a communication control unit 406 in the second information processing device 402 sets a communication unit (for example a communication unit 407 as illustrated in FIG. 1) included in the second information processing device 402 to the first state (step S308).

In response to the arrival of the determined timing, the first information processing device 401 transmits a first signal to the second information processing device 402 via the communication network 403 (step S309). The second information processing device 402 receives the first signal (step S310) and transmits a second signal responding to the first signal to the first information processing device 401 (step S311).

The second signal may be for example an acknowledgement (ack) signal indicating that the first signal has been received or may be a signal including information about the timing at which the second information processing device 402 received the first signal.

The first information processing device 401 receives the second signal transmitted from the second information processing device 402 (step S312). In response to the first information processing device 401 receiving the second signal, the estimation unit 104 estimates a communication bandwidth relating to the communication network 403 on the base of the timing information included in the second signal, for example (step S313).

Processing similar to the processing performed when the K-th first signal is transmitted is performed when subsequently the (K+1)-th first signal is transmitted. In the following description, the processing performed when the (K+1)-th first signal is transmitted will be described with reference to the step numbers used in the description of the processing performed when the K-th first signal is transmitted.

The setting device 101 transmits a setting signal to the second information processing device 402 (step S306).

In response to receiving the setting signal (step S307), the second information processing device 402 sets a communication unit (for example a communication unit 407 as illustrated in FIG. 1) in the second information processing device 402 to the first state (step S308).

The first information processing device 401 transmits a first signal to the communication unit in the second information processing device 402 (step S309). The second information processing device 402 receives the first signal (step S310) and transmits a second signal responding to the first signal to the first information processing device 401 (step S311).

The first information processing device 401 receives the second signal transmitted from the second information processing device 402 (step S312). In response to the first information processing device 401 receiving the second signal, the estimation unit 104 estimates a communication bandwidth relating to the communication network 403 on the base of timing information included in the second signal, for example (step S313).

The server device 107 according to the first example embodiment illustrated in FIG. 7 has the advantageous effect of precisely estimating a communication bandwidth relating to the communication network 403. Further, the server device 107 according to the first example embodiment can provide an environment that enables a communication bandwidth to be precisely estimated even when time measured by the system clock of the server device 107 differs from time measured by the system clock of the second information processing device 402. The system clock within each device may measure time independently of system clocks of the other devices, for example. This is because the K-th timing and the timing at which the setting signal is transmitted are measured by the system clock of the server device 107.

As the server device 107 includes the first information processing device 401 and the setting device 101, the first information processing device 401, and the setting device 101 operate on the base of the system clock of the server device 107. Accordingly, the K-th timing and the timing at which the setting signal is transmitted are measured by the system clock of the server device 107. Consequently, the setting device 101 can transmit the setting signal properly even when there is a difference between time measured by the system clock of the second information processing device 402 and time measured by the system clock of the first information processing device 401. Accordingly, the communication facility in the second information processing device 402 receives a signal from the first information processing device 401 within a period in which the communication facility is in the first state. Consequently, the server device 107 according to the present example embodiment can precisely estimate a communication bandwidth even when time measured by the system clock of the first information processing device 401 differs from time measured by the system clock of the second information processing device 402.

Second Example Embodiment

Next, a second example embodiment of the present invention based on the above-described first example embodiment will be described.

Hereinafter, description will be made focusing on characteristic features of the present example embodiment. The same reference numerals are given to the same configurations as those of the above-described first example embodiment, and redundant explanations will be omitted.

Figure 9:
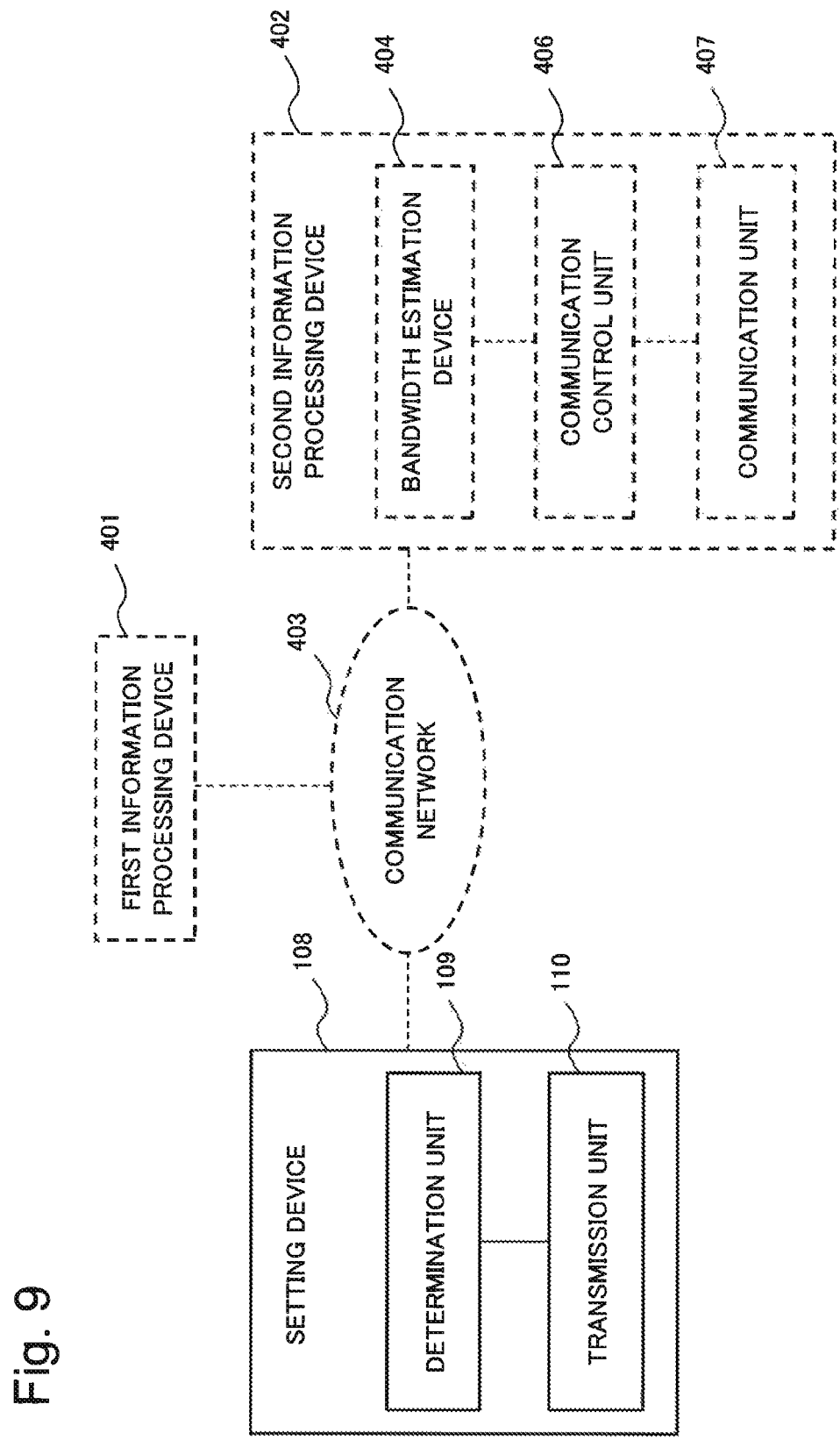
FIG. 9 is a block diagram illustrating a configuration of a setting device according to a second example embodiment of the present invention.
Figure 10:
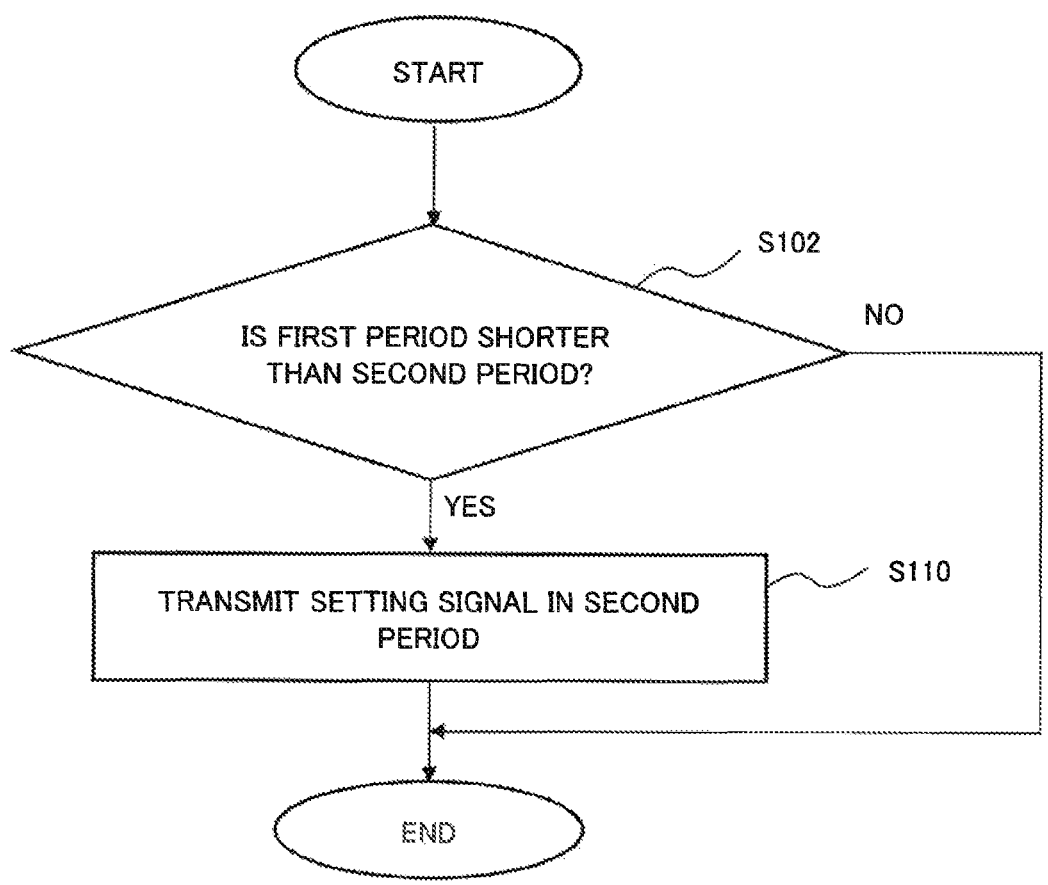
FIG. 10 is a flowchart illustrating a process flow in the setting device according to the second example embodiment.
Figure 11:
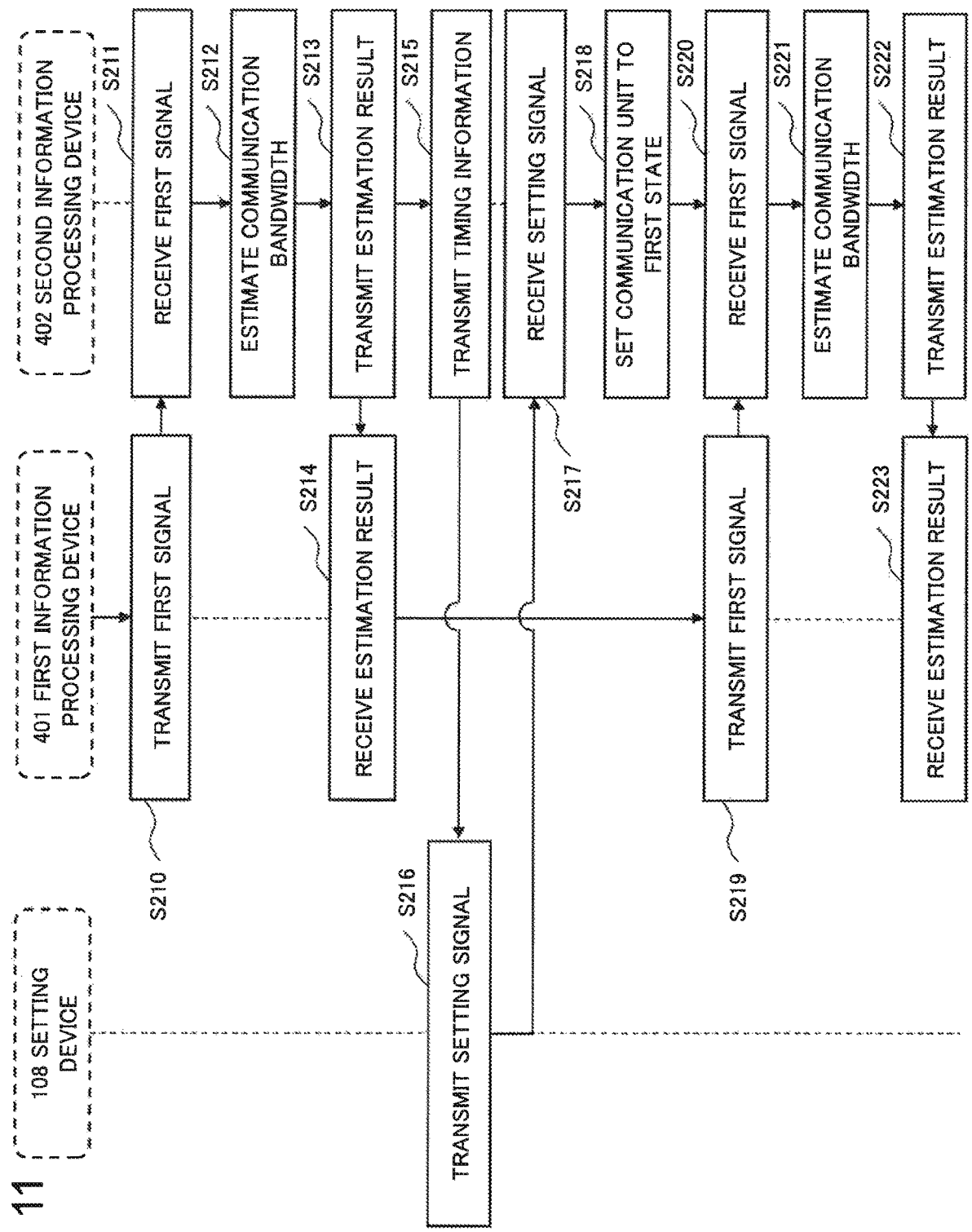
FIG. 11 is a sequence diagram illustrating a process performed by the setting device, a first information processing device, and a second information processing device according to the second example embodiment.

A configuration of a setting device 108 according to a second example embodiment and processing performed by the setting device 108 will be describe with reference to FIGS. 9 to 11. FIG. 9 is a block diagram illustrating a configuration of the setting device 108 according to the second example embodiment of the present invention. FIG. 10 is a flowchart illustrating a process flow in the setting device 108 according to the second example embodiment. FIG. 11 is a sequence diagram illustrating a process performed by the setting device 108, a first information processing device 401, and a second information processing device 402 according to the second example embodiment.

The setting device 108 according to the second example embodiment includes a determination unit 109 and a transmission unit 110.

As seen from FIG. 11, processing similar to the process illustrated in step S210 to step S213 of FIG. 3 is performed. Then, the first information processing device 401 receives an estimation result transmitted from the second information processing device 402 (step S214).

Then the second information processing device 402 transmits timing information to the setting device 108 via a communication network 403 (step S215). The timing information in this case includes information representing the K-th timing described above and the time while a communication unit 407 is in a first state before transition to a second state (hereinafter referred to as the "first period"). Alternatively, the timing information may further include information representing a second period from the K-th timing to the (K+1)-th timing.

The first period may be the time between the K-th reply timing at which a signal responding to the K-th first signal is transmitted and the timing at which the communication unit 407 is set into the second state. When the second information processing device 402 performs some processing (hereinafter referred to as the "second processing") after the K-th reply timing, the second information processing device 402 may set the period between the timing at which the second processing ends and the timing at which the communication unit 407 is set into the second state as the first period. In this case, the second information processing device 402 transmits timing information to the setting device 108 in response to the end of the second processing.

Then, the setting device 108 performs the process illustrated in step S216. The process illustrated in step S216 will be described in detail with reference to FIG. 10. The setting device 108 receives timing information. In response to the setting device 108 receiving the timing information, the determination unit 109 determines whether or not the first period is shorter than the second period (step S102).

When the determination unit 109 determines that the first period is shorter than the second period (YES at step S102), the determination unit 109 transmits a setting signal to the second information processing device 402 in the second period (step S110, i.e. step S216 of FIG. 11). When the determination unit 109 determines that the first period is longer than the second period or the length of the first period is equal to the length of the second period (NO at step S102), the determination unit 109 does not perform the process illustrated in step S110.

Processing subsequent to step S216 will be described with reference to FIG. 11. In response to receiving the setting signal (step S217), the communication control unit 406 sets the communication unit 407 in the second information processing device 402 to a first state (step S218).

In response to the arrival of a determined timing, the first information processing device 401 transmits a first signal to the second information processing device 402 (step S219).

Then, in response to the arrival of the first signal from the first information processing device 401, the communication unit 407 receives the first signal (step S220). In response to the communication unit 407 in the second information processing device 402 receiving the first signal, a bandwidth estimation device 404 estimates a communication bandwidth relating to the communication network 403 (step S221). The second information processing device 402 transmits the estimation result relating to the estimated communication bandwidth to the first information processing device 401 (step S222).

The first information processing device 401 receives the estimation result (step S223).

Advantageous effects of the setting device 108 according to the second example embodiment will be described next.

The setting device 108 according to the present example embodiment has the advantageous effect of enabling precise estimation of a communication bandwidth. Further, the setting device 108 according to the present example embodiment has the advantageous effect of reducing the amount of communication traffic and the frequency of communications. This is because of reasons 1 and 2:

(Reason 1) The configuration of the setting device 108 according to the second example embodiment includes a configuration similar to the setting device 101 according to the first example embodiment, and (Reason 2) When it is determined that the first period is longer than the second period, the transmission unit 110 does not transmit a setting signal to the second information processing device 402.

When the first period is longer than the second period, the communication unit 407 is set to the second state after a third timing. In this case, the communication unit 407 is in the first state at the third timing without having to receiving a setting signal. Therefore, when the first period is longer than the second period, the setting device 108 does not need to transmit a setting signal to the second information processing device 402. Thus, the setting device 108 according to the present example embodiment has the advantageous effect of reducing the amount of communication traffic and the frequency of communications.

Third Example Embodiment

Next, a third example embodiment of the present invention based on the above-described first example embodiment will be described.

Hereinafter, description will be made focusing on characteristic features of the present example embodiment. The same reference numerals are given to the same configurations as those of the above-described first example embodiment, and redundant explanations will be omitted.

Figure 12:
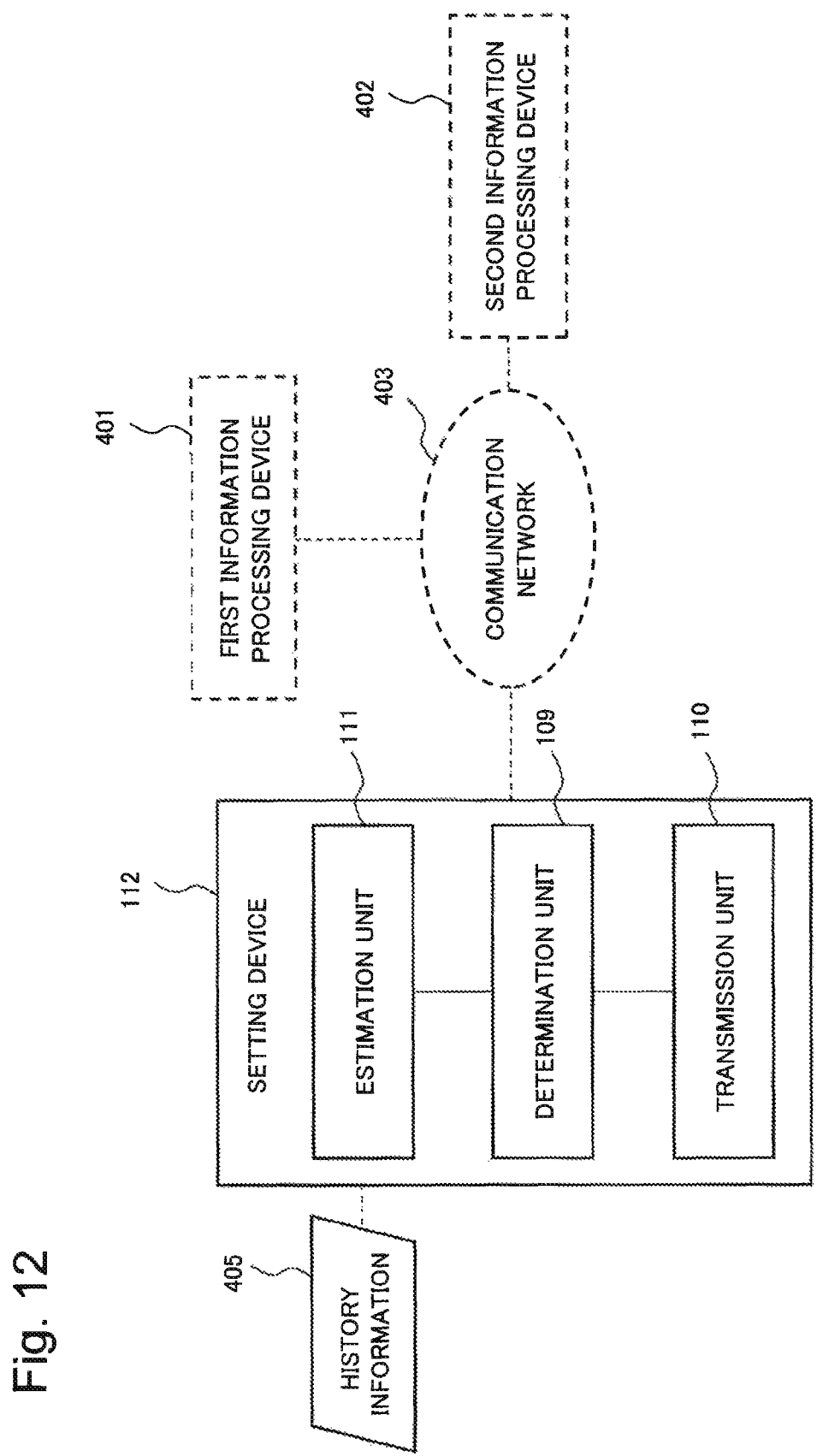
FIG. 12 is a block diagram illustrating a configuration of a setting device according to a third example embodiment of the present invention.
Figure 13:
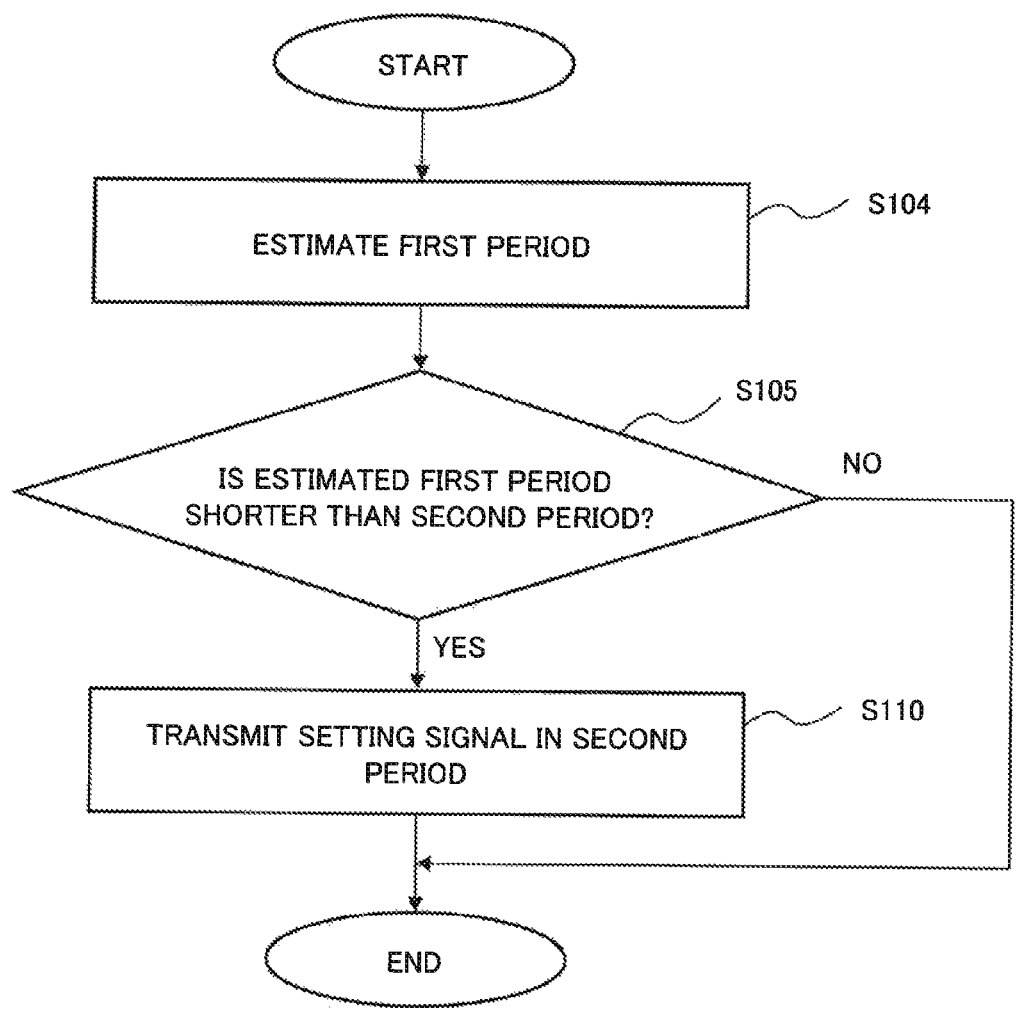
FIG. 13 is a flowchart illustrating a process flow in the setting device according to the third example embodiment.

A configuration of a setting device 112 according to a third example embodiment and processing performed by the setting device 112 will be described with reference to FIGS. 12 and 13. FIG. 12 is a block diagram illustrating a configuration of the setting device 112 according to the third example embodiment of the present invention. FIG. 13 is a flowchart illustrating a processing flow in the setting device 112 according to the third example embodiment.

The setting device 112 according to the third example embodiment includes an estimation unit 111, a determination unit 109 and a transmission unit 110.

First, the estimation unit 111 estimates a first period on the base of history information 405 in which a K-th timing (where K represents an integer greater than or equal to 1), the (K+1)-th timing and a state (for example a first state or a second state) of the communication unit 407 at the (K+1)-th timing are associated with one another (step S104).

The history information 405 may not include information about the state of the communication unit 407, for example. The history information 405 may be information about a state in which a communication facility in a third information processing device is placed when the third information processing device is used to estimate a communication bandwidth.

For example, the estimation unit 111 computes the difference between the (K+1)-th timing associated with a first state and the K-th timing associated with the first state on the base of the history information 405. For convenience of explanation, the difference is referred to as a "first transmission interval". In other words, the first transmission interval represents the length of the period while the communication unit 407 is estimated to be in the first state between the K-th timing and the (K+1)-th timing. Similarly, the estimation unit 111 computes the difference between the (K+1)-th timing associated with the second state and the K-th timing associated with the first state on the base of the history information 405. For the convenience of explanation, the difference is referred to as a "second transmission interval". In other words, the second transmission interval represents the length of the period from the K-th timing to the (K+1)-th timing and the period while the communication unit 407 changes from the first state to the second state. For example, the estimation unit 111 estimates the first period by computing the average of the maximum value among first transmission intervals and the minimum value among second transmission intervals.

The procedure with which the estimation unit 111 estimates the first period is not limited to the method described above; for example, the procedure may estimate the average over the averaged first transmission intervals and the averaged second transmission intervals as the first period. The procedure may estimate the average over the minimum value of first transmission intervals and the maximum value of second transmission intervals as the first period. The procedure may estimate the maximum value of second transmission intervals as the first period.

Then, the determination unit 109 determines whether or not the first period is shorter than the second period (step S105). Here, the first period is an estimated time between the end of processing and the timing at which the communication unit 407 is set to the second state after executing some processing.

When the determination unit 109 determines that the estimated first period is shorter than the second period (YES at step S105), the determination unit 109 transmits a setting signal to the second information processing device 402 in the second period (step S110). When the determination unit 109 determines that the estimated first period is longer than or equal to the second period (NO at step S105), the determination unit 109 does not perform the process illustrated in step S110.

In the history information 405, at least one of the type of hardware relating to the second information processing device 402 and the type of software relating to the second information processing device 402 may also be associated with information described above.

For example, in this case, the estimation unit 111 refers to at least one of the type of hardware relating to an information processing device used for estimation of a communication bandwidth (referred to as the "third information processing device" for convenience of explanation) and the type of software relating to the third information processing device. For example, the estimation unit 111 reads information associated with a type of hardware that is the same as (or similar to) the type of hardware relating to the third information processing device from the history information 405 and estimates the first period on the base of the read information in accordance with the procedure as described above.

For example, the estimation unit 111 reads information associated with a type of software that is the same as (or similar to) the type of software relating to the third information processing device from the history information 405 and estimates the first period on the base of the read information in accordance with the procedure as described above. Alternatively, the estimation unit 111 reads information associated with types that are the same as (or similar to) the above-mentioned two types relating to the third information processing device from the history information 405 and estimates the first period on the base of the read information in accordance with the procedure as described above.

Advantageous effects of the setting device 112 according to the third example embodiment will be described next.

The setting device 112 according to the present example embodiment enables precise estimation of a communication bandwidth. Further, the setting device 112 according to the present example embodiment enables a communication bandwidth to be precisely estimated even when the first period is unknown.

This is because of reasons 1 and 2:

(Reason 1) The configuration of the setting device 112 according to the third example embodiment includes a configuration similar to the setting device 101 according to the first example embodiment, and (Reason 2) The estimation unit 111 estimates the first period on the base of the history information 405 even when the first period is unknown.

Further, if the history information 405 includes at least one of the type of hardware and the type of software, the setting device 112 according to the third example embodiment can provide an environment that enables a communication bandwidth to be more precisely estimated. This is because the second period often depends on at least one of the type of hardware and the type of software.

The estimation unit 111 estimates the first period on the base of the history information 405 associated with at least one of the type of hardware and the type of software. Since the first period often depends on at least one of the type of hardware and the type of software, the estimation unit 111 can estimate the first period more precisely. Consequently, the transmission unit 110 can transmit a setting signal at an appropriate timing and thus the setting device 112 according to this example embodiment can provide an environment that enables a communication bandwidth to be more precisely estimated.

(Hardware Configuration Example)

A configuration example of hardware resources that realize setting devices in the above-described example embodiments of the present invention using a single calculation processing apparatus (an information processing apparatus or a computer) will be described. However, the setting devices may be realized using physically or functionally at least two calculation processing apparatuses. Further, the setting devices may be realized as a dedicated apparatus.

Figure 14:
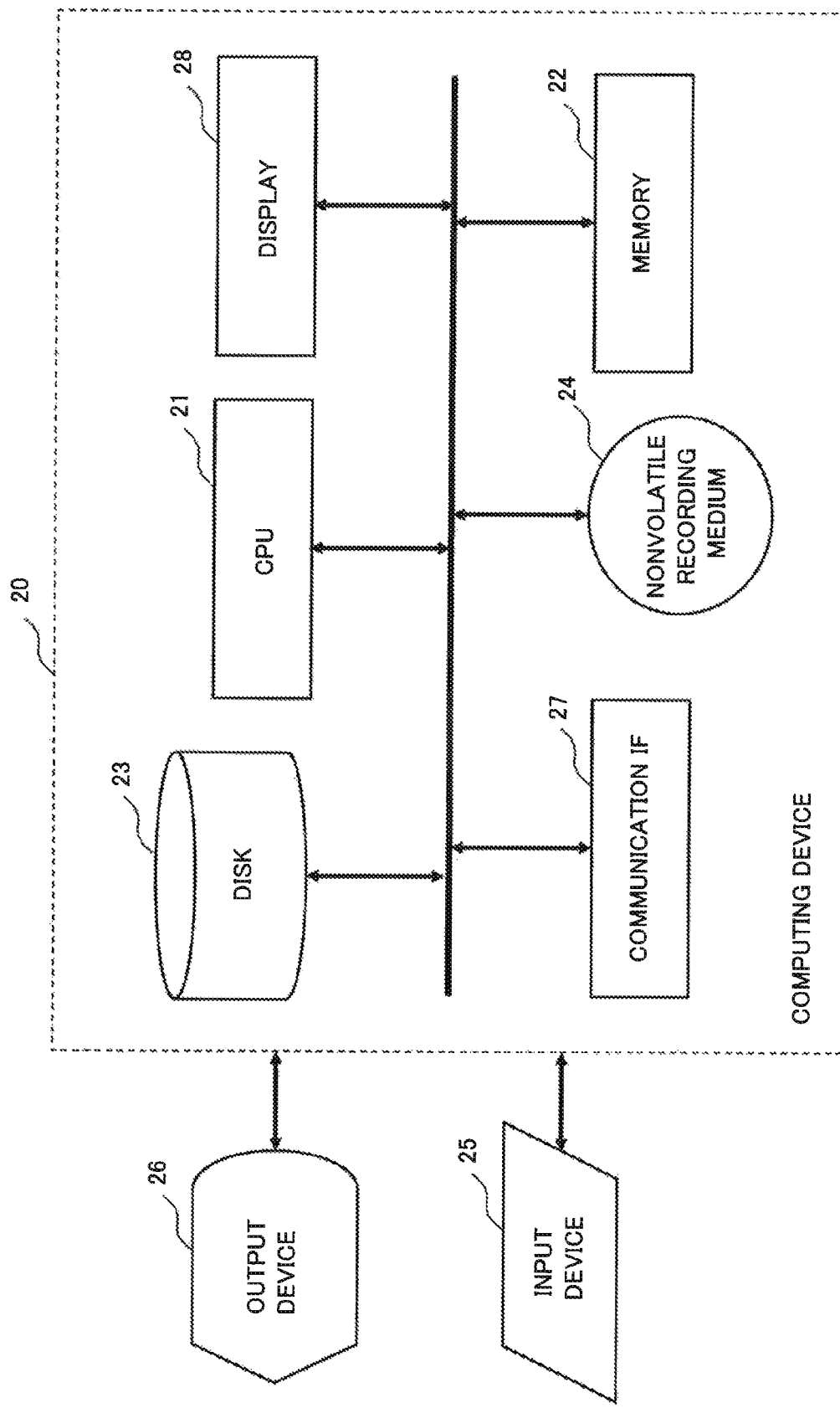
FIG. 14 is a block diagram schematically illustrating a hardware configuration of a calculation processing apparatus capable of realizing the setting devices according to each example embodiment.

FIG. 14 is a block diagram schematically illustrating a hardware configuration of a calculation processing apparatus capable of realizing the setting devices according to first to third example embodiments. A calculation processing apparatus 20 includes a central processing unit (CPU) 21, a memory 22, a disc 23, and a non-transitory recording medium 24. A calculation processing apparatus 20 further includes an input apparatus 25, an output apparatus 26, a communication interface (hereinafter, expressed as a "communication I/F") 27 and a display 28. The calculation processing apparatus 20 can execute transmission/reception of information to/from another calculation processing apparatus and a communication apparatus via the communication I/F 27.

The non-volatile recording medium 24 is, for example, a computer-readable Compact Disc, Digital Versatile Disc. The non-volatile recording medium 24 may be Universal Serial Bus (USB) memory, Solid State Drive or the like. The non-transitory recording medium 24 allows a related program to be holdable and portable without power supply. The non-transitory recording medium 24 is not limited to the above-described media. Further, a related program can be carried via a communication network by way of the communication I/F 27 instead of the non-transitory medium 24.

In other words, the CPU 21 copies, on the memory 22, a software program (a computer program: hereinafter, referred to simply as a "program") stored by the disc 23 when executing the program and executes arithmetic processing. The CPU 21 reads data necessary for program execution from the memory 22. When display is needed, the CPU 21 displays an output result on the display 28. When a program is input from the outside, the CPU 21 reads the program from the input apparatus 25. The CPU 21 interprets and executes an setting program (FIG. 2, "setting device" in FIG. 3, "server device" in FIG. 8, FIG. 10, "setting device" in FIG. 11 or FIG. 13) present on the memory 22 corresponding to a function (processing) indicated by each unit illustrated in FIG. 1, FIG. 5, FIG. 6, FIG. 7, FIG. 9, or FIG. 12 described above. The CPU 21 sequentially executes the processing described in each example embodiment of the present invention.

In other words, in such a case, it is conceivable that the present invention can also be made using the setting program. Further, it is conceivable that the present invention can also be made using a computer-readable, non-transitory recording medium storing the setting program.

The present invention has been described using the above-described example embodiments as example cases.

However, the present invention is not limited to the above-described example embodiments. In other words, the present invention is applicable with various aspects that can be understood by those skilled in the art without departing from the scope of the present invention.

This application is based upon and claims the benefit of priority from Japanese patent application No. 2014-233883, filed on Nov. 18, 2014, the disclosure of which is incorporated herein in its entirety.

REFERENCE SIGNS LIST

101 Setting device
102 Transmission unit
401 First information processing device
402 Second information processing device
403 Communication network
404 Bandwidth estimation device
406 Communication control unit
407 Communication unit
103 Control unit
104 Estimation unit
105 Communication system
113 Second information processing device
106 Client device
107 Server device
108 Setting device
109 Determination unit
110 Transmission unit
111 Estimation unit
112 Setting device
405 History information

The invention claimed is:

1. A setting device comprising:
a determination unit configured to determine whether or not a first period is shorter than a second period, wherein
the first period comprises a period between (i) a reply timing at which a second information processing device transmits a signal responding to a first signal to a first information processing device and (ii) a timing at which a communication unit of the second information processing device is set, due to not performing communication, into a second state representing a state in which throughput of the communication unit of the second information processing device is lower than a predetermined throughput, and
the second period comprises a period between (i) a first timing at which the first information processing device transmits the first signal for measuring communication bandwidth of a communication network to the second information processing device and (ii) a third timing at which the first information processing device transmits a next first signal to the second information processing device; and
a transmission unit configured to transmit, before the third timing, a setting signal for setting the communication unit of the second information processing device into a communication-enabled state to the second information processing device when the determination unit determines that the first period is shorter than the second period.

2. The setting device according to claim 1, wherein, when it is determined that the first period is longer than the second period, the transmission unit is configured not to transmit the setting signal.

3. The setting device according to claim 1, wherein the trasmission unit is further configured to transmit the setting signal at a timing before the third timing.

4. The setting device according to claim 1, further comprising:
an estimation unit configured to estimate the first period on basis of history information in which the first timing, the third timing and a state in which a communication unit of a third information processing device that has received the first signal is placed at the third timing are associated with, wherein
the determination unit makes the determination on basis of the first period estimated by the estimation unit.

5. The setting device according to claim 4, wherein
in the history information, at least one of a type of hardware relating to the third information processing device or a type of software running on the third information processing device is further associated, and
the estimation unit estimates the first period further on basis of at least one of the type of the hardware or the type of the software.

6. A communication system comprising:
the setting device according to claim 1;
a communication control unit configured to set the communication unit of the second information processing device to a first state representing a state representing higher throughput than the predetermined throughput in response to the setting signal;
an estimation unit configured to estimate the communication bandwidth of the communication network on basis of the first signal; and
a decision unit configured to decide, on basis of the communication bandwidth, to add or remove a control device controlling the communication network.

7. A client device comprising:
the setting device according to claim 1; and
the second information processing device, wherein
the second information processing device includes:
a communication control unit configured to set the communication unit of the second information processing device to a first state representing a state where a throughput is higher than the predetermined throughput in response to the setting signal; and
an estimation unit configured to estimate the communication bandwidth of the communication network.

8. A server device comprising:
the setting device according to claim 1; and
the first information processing device which transmits the first signal to the second information processing device in response to arrival of the first timing and in response to arrival of the third timing.

9. The setting device according to claim 1, wherein:
the communication-enabled state is an active state; and
the second state is a sleep state.

10. A setting method comprising:
determining whether or not a first period is shorter than a second period, wherein
the first period comprises a period between (i) a reply timing at which a second information processing device transmits a signal responding to a first signal to a first information processing device and (ii) a timing at which a communication unit of the second information processing device is set, due to not performing communication, into a second state representing a state in which throughput of the communication unit of the second information processing device is lower than a predetermined throughput, and the second period comprises a period between (i) a first timing at which the first information processing device transmits the first signal for measuring communication bandwidth of a communication network to the second information processing device and (ii) a third timing at which the first information processing device transmits a next first signal to the second information processing device; and transmitting, before the third timing, a setting signal for setting the communication unit of the second information processing device into a communication-enabled state to the second information processing device when determining that the first period is shorter than the second period.

11. The setting method according to claim 10, wherein: the communication-enabled state is an active state; and the second state is a sleep state.

12. A non-transitory recording medium storing a setting program recorded therein, the program making a computer achieve:

a determination function configured to determine whether or not a first period is shorter than a second period, wherein the first period comprises a period between (i) a reply timing at which a second information processing device transmits a signal responding to a first signal to a first information processing device and (ii) a timing at which a communication unit of the second information processing device is set, due to not performing communication, into a second state representing a state in which throughput of the communication unit of the second information processing device is lower than a predetermined throughput, and the second period comprises a period between (i) a first timing at which the first information processing device transmits the first signal for measuring communication bandwidth of a communication network to the second information processing device and (ii) a third timing at which the first information processing device transmits a next first signal to the second information processing device; and a transmission function configured to transmit, before the third timing, a setting signal for setting the communication unit of the second information processing device into a communication-enabled state to the second information processing device when the determination function determines that the first period is shorter than the second period.

13. The non-transitory recording medium according to claim 12, wherein:

the communication-enabled state is an active state; and the second state is a sleep state.

* * * * *